(12) United States Patent
Doskocil

(10) Patent No.: US 8,322,966 B2
(45) Date of Patent: Dec. 4, 2012

(54) LEVEL LIFT TRAILER WITH DETACHABLE CARGO BED

(76) Inventor: David Lee Doskocil, San Bernardino, CA (US)

( * ) Notice: Subject to any disclaimer, the term of this patent is extended or adjusted under 35 U.S.C. 154(b) by 0 days.

(21) Appl. No.: 12/001,673

(22) Filed: Dec. 11, 2007

(65) Prior Publication Data

US 2008/0093822 A1 Apr. 24, 2008

Related U.S. Application Data

(63) Continuation-in-part of application No. 10/817,368, filed on Apr. 5, 2004, now abandoned.

(51) Int. Cl.
*B60P 1/64* (2006.01)
(52) U.S. Cl. .................................. 414/498; 280/33.995
(58) Field of Classification Search .............. 414/495, 414/498, 539–541; 280/33.995, 656, 6.151
See application file for complete search history.

(56) References Cited

U.S. PATENT DOCUMENTS

| | | | |
|---|---|---|---|
| 2,230,014 A | 1/1941 | Raven | |
| 2,485,300 A | 10/1949 | Lisota | |
| 2,905,481 A | 9/1959 | Schramm | |
| 3,268,236 A * | 8/1966 | Stevens | 280/43.23 |
| 4,372,572 A | 2/1983 | Verschage | |
| 4,461,609 A | 7/1984 | Zinno | |
| 4,673,328 A | 6/1987 | Shiels | |
| 4,685,855 A | 8/1987 | Celli | |
| 4,930,799 A | 6/1990 | Pihlstrom | |
| 5,035,462 A | 7/1991 | Page | |
| 5,059,085 A | 10/1991 | Koller | |
| 5,288,197 A | 2/1994 | Harris | |
| 5,460,473 A | 10/1995 | LaMora | |
| 5,536,131 A | 7/1996 | Behr | |
| 5,630,693 A | 5/1997 | Sobina | |
| 5,829,945 A | 11/1998 | Stanley | |
| 6,099,232 A | 8/2000 | Dixon | |
| 6,113,130 A | 9/2000 | Saulce | |
| 6,149,369 A | 11/2000 | Reed | |
| 6,273,435 B1 | 8/2001 | Stringer | |
| 6,663,132 B1 * | 12/2003 | Kizy | 280/479.1 |
| 7,044,704 B1 * | 5/2006 | Roose | 414/471 |
| 7,153,080 B2 * | 12/2006 | Schmidt | 414/482 |

FOREIGN PATENT DOCUMENTS

| | | |
|---|---|---|
| EP | 1 873 010 A2 | 1/2008 |
| GB | 2190349 A | 5/1987 |
| WO | WO-86/03168 | 6/1986 |

* cited by examiner

*Primary Examiner* — Saul Rodriguez
*Assistant Examiner* — Jonathan Snelting
(74) *Attorney, Agent, or Firm* — Dickstein Shapiro LLP

(57) ABSTRACT

An open center trailer with spring suspended axles which straddle a detached cargo bed, which was loaded on the ground, said trailer level lifts the cargo bed by pulling said cargo bed up its channel ramps to an elevated transport height, and consequently level lowers and detaches from this load bed at another location. This load may be a cargo utility platform, or an enclosed cargo box, or a horse traveling compartment, or a dump bed, or a highway light, or a traffic speed sign.

13 Claims, 9 Drawing Sheets

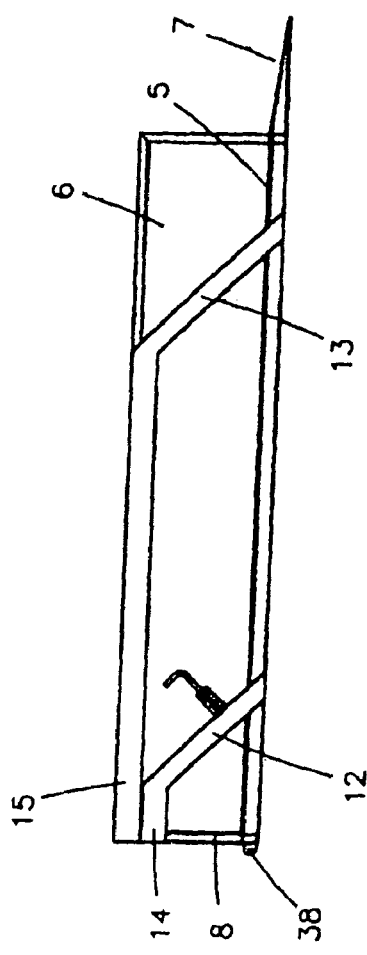
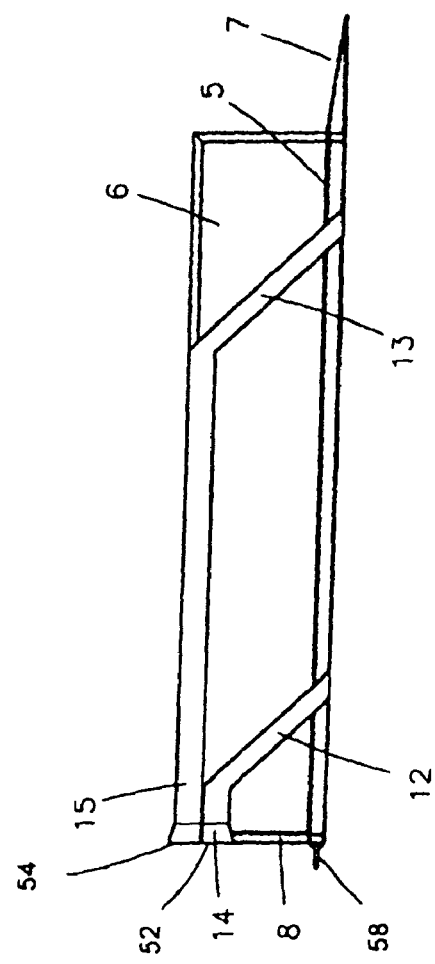
FIG. 2a
FIG. 2b

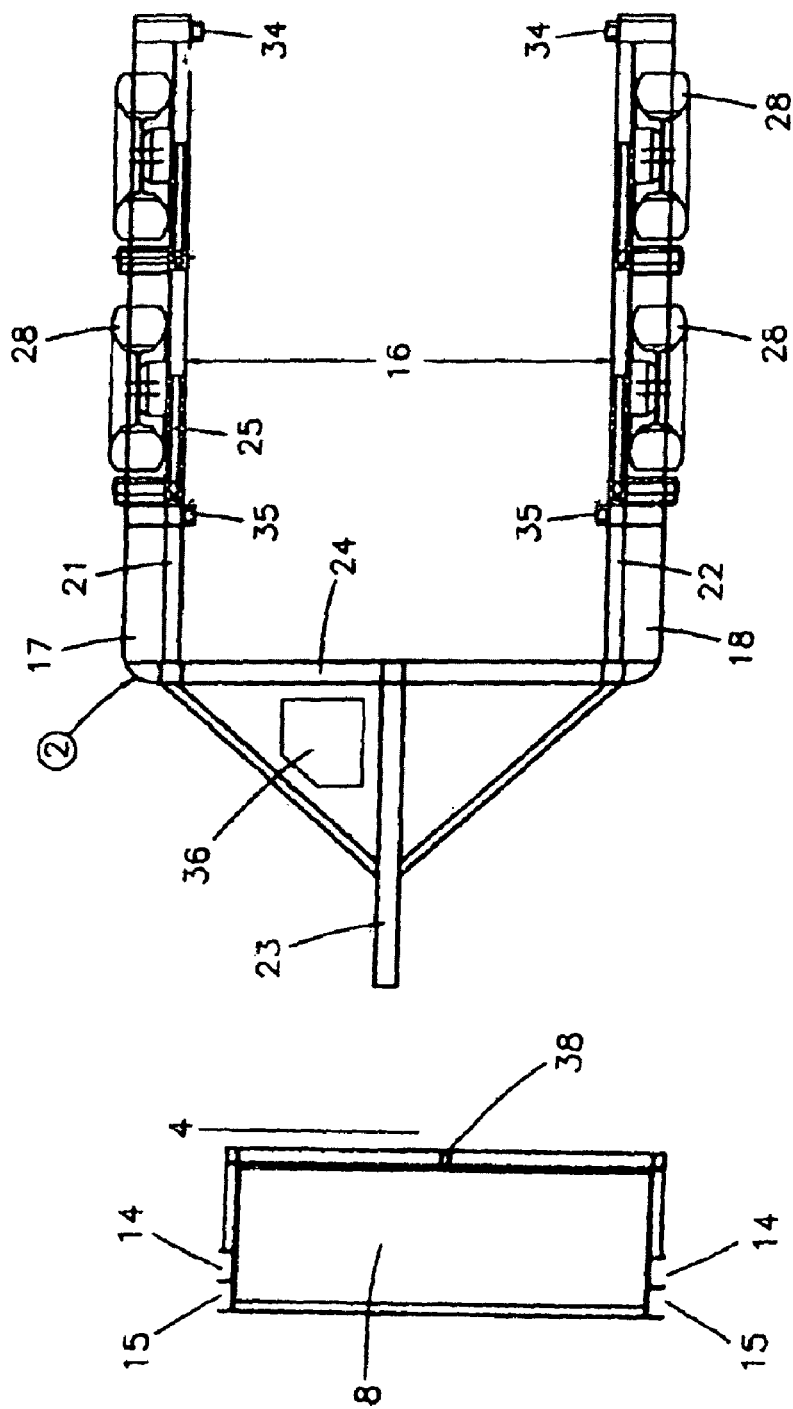

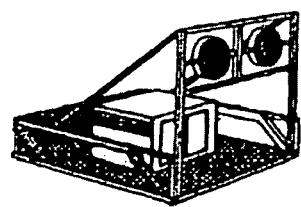
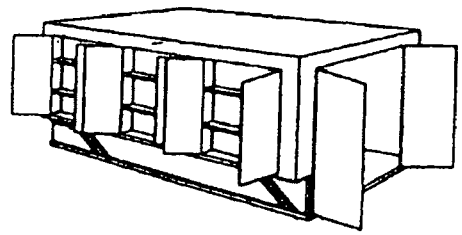
FIG. 14a
FIG. 14b
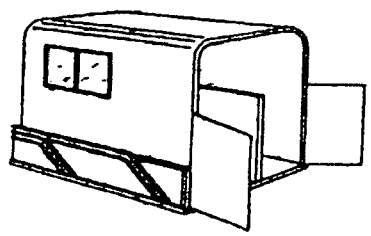
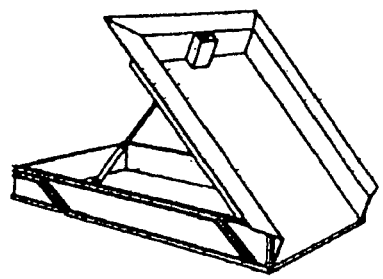
FIG. 14c
FIG. 14d
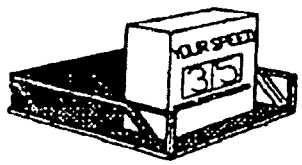
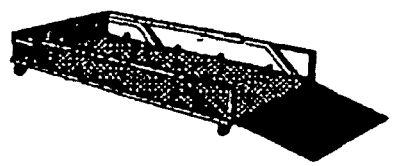
FIG. 14e
FIG. 14f

LEVEL LIFT TRAILER WITH DETACHABLE CARGO BED

CROSS-REFERENCE TO RELATED APPLICATIONS

This application is a continuation-in-part of U.S. application Ser. No. 10/817,368 filed Apr. 5, 2004 now abandoned. This application claims the benefit of U.S. application Ser. No. 10/817,368 filed Apr. 5, 2004, which disclosure is incorporated herein by reference.

BACKGROUND

1. Technical Field

The present invention pertains generally to the field of hauling cargo on highways with motor vehicles and more specifically to cargo carried with trailers.

2. Description of Related Art

A loaded cargo is usually carried over a hauling cargo bed which is mounted on a truck chassis frame. In order to achieve this, it is required to lift up the cargo onto the hauling bed. Many designs have sought to ease this task. U.S. Pat. No. 2,485,300 issued to Lisota uses a tilting and moving bed to load or unload a truck. Many refinements of this method are used to lift up large cargo containers on truck chassis. LaMora in U.S. Pat. No. 5,460,473 shows a system using a trailer to haul two containers in line. Alternately, U.S. Pat. No. 6,099,232 to Dixon shows a smaller cargo bed loaded into a pick up truck. Although these methods are widely used today, they are not practical for unpacked cargoes, nor can they be used to load or unload live animals.

U.S. Pat. No. 2,230,014 issued to Haven describes a lifting/lowering trailer using a system of cams and links. Verschage in U.S. Pat. No. 4,372,572 uses cams, links and hydraulic cylinders to lift heavy loads, such as fork lifts. U.S. Pat. No. 5,630,693 issued to Sobina shows a design of a level lift trailer bed which is kept in alignment by inner sliding telescoping guides as it is lifted by hydraulic cylinders at each corner of the chassis. In each of these devices, the cargo or load carrying member is a permanent integral part of the trailer.

Adding versatility to his tilting frame trailer, Pihlstrom in U.S. Pat. No. 4,930,799 is able to interchange the cargo carrier. But, this system can not lift a loaded cargo carrier.

Therefore, there is a strong desire for a simple, reliable and heavy capacity level lifting trailer system capable of detaching from its cargo bed, or from an interchangeable bed, in some other configurations.

SUMMARY

The present invention is directed to a heavy level lift trailer system in which its cargo is always level with the ground, whether it is being raised into transport position or being lowered to the ground. The same design is applicable to light systems as well.

A further novel feature of the invention is the ability to release a cargo bed from the trailer. Therefore the cargo bed can be loaded and unloaded while sitting on the ground and detaching from the trailer. In other words, a single trailer that can move a variety of cargo beds whether loaded or unloaded. This system feature uniquely suits the delivery process of the manufacturing and the construction industries. The cargo beds are not necessarily to be the same, one delivery might be a load of wood, and the next could be a lockable multi door tool crib attached to saw table and stock rack.

Accordingly, it is another object of the present invention to provide a safe and easy transportation of live cargoes such as horses. A ground level loading and unloading of horses removes the danger and risk of injury to these animals.

It is yet a further object of the present invention to provide an alternate design which may be incorporated into specialized systems for use in areas where very high theft potential prevails. The novel feature of raising up and lowering down a trailer bed allows for an inexpensive single axle custom cargo bed to be used in areas where the equipment must be left unattended for an extended period of time. Thus, the tires and wheels of the trailer are is never exposed.

To these ends, the level lifting trailer with the option of multiple detachable cargo beds in the present invention, compromises a safe and economical cargo-transfer and delivery system.

These and other objects, features, aspects, and advantages of the present invention will become better understood with reference to the following description and accompanying drawings.

BRIEF DESCRIPTION OF THE DRAWINGS

FIG. 2a is a side view of one embodiment of the cargo bed of FIG. 1.

FIG. 2b is a side view of another embodiment of the cargo bed of FIG. 1.

FIG. 3 is a front end view of one embodiment of the cargo bed of FIG. 2a.

FIG. 4 is a plan view of the lift trailer of FIG. 1.

FIG. 14a is a perspective view of an alternate cargo bed with portable highway traffic light.

FIG. 14b is a perspective view of an alternate cargo bed with enclosed cargo box.

FIG. 14c is a perspective view of an alternate cargo bed with ground level loading horse compartment.

FIG. 14d is a perspective view of an alternate dumping cargo bed.

FIG. 14e is a perspective view of an alternate cargo bed with traffic speed sign.

FIG. 14f is a perspective view of an alternate cargo bed with open cargo platform with castered wheels.

DETAILED DESCRIPTION

Description will be hereinafter made of one embodiment of a level lift trailer with detachable cargo bed according to the present invention with reference to the drawings. Additionally, in the following descriptions of the drawings, the same or similar portions are assigned with the same or similar reference symbols. It should be noted that each drawing is a schematic diagram, and may represent different dimensional ratios and the like from those of the actual vehicle. Hence, specific dimensions and the like should be determined in consideration of the following descriptions. Furthermore, as a matter of course, different drawings include elements which have different dimensional relations and ratios.

Figure 1:
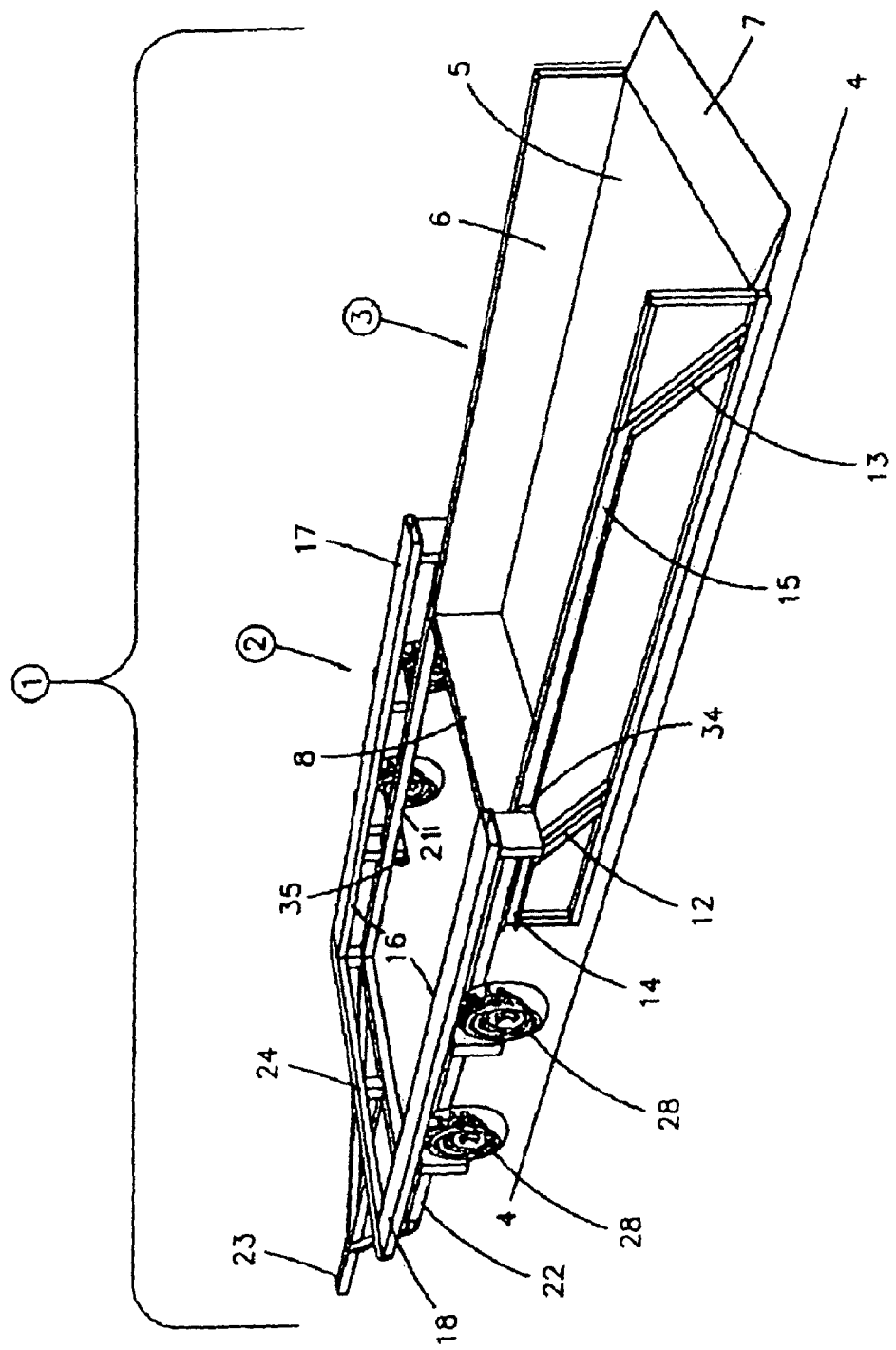
FIG. 1 is a perspective view of one embodiment of a lift trailer with a cargo bed lowered and partially removed.

Referring to the drawings, FIG. 1 is a perspective view of a trailer system 1 of the preferred embodiment. The trailer system 1 has a trailer assembly 2 and a cargo bed assembly 3 which is sitting on the ground 4 and partially detached from the trailer assembly 2.

In the embodiment of FIG. 1, the trailer assembly 2 has a tongue 23 which is attached to a head structure 24. The head structure 24 is further attached to four side structure beams 17, 18, 21 and 22 where side structure beams 17 and 21 attached to one end of the head structure 24 and side structure beams 18 and 22 attached to the other end of the head structure 24. Side structure beams 17 and 21 separate from side structure beams 18 and 22 by an open space 16. Two rear lifting rollers 34 are disposed to the opposite inner surface of the side structure beams 21 and 22. Two front lifting rollers 35 are disposed to the opposite inner surface of the side structure beams 21 and 22. The front lifting rollers 35 are mounted at a level lower than the rear lifting rollers 34.

In the embodiment of FIG. 1, the cargo bed assembly 3 has a bed 5, two opposite side walls 6, a head end 8, and a ramp 7. Two inclined channel tracks 12 are angled substantially at 45 degrees toward the ground 4 and are disposed to the outside surface of the side walls 6 near the head end 8. Two additional inclined channel tracks 13 angled substantially parallel to the inclined channel tracks 12 are disposed to the outside surface of the side walls 6 near the ramp 7 of the cargo bed assembly 3. The inclined channel tracks 12 are sized to receive the front lifting rollers 35 while the inclined channel tracks 13 are sized to receive the rear lifting rollers 34. Two horizontal channel extensions 14 are disposed to the outside surface of the side walls 6 and horizontally extending from the head end 8 to the upper ends of the inclined channel tracks 12. Additionally, two horizontal channel extensions 15 are disposed to the outside surface of the side walls 6 and horizontally extending from the head end 8 to the upper ends of the inclined channel tracks 13. The horizontal channel extensions 14 are used to receive and guide the front lifting rollers 35 while the horizontal channel extensions 15 are used to receive and guide the rear lifting rollers 34.

FIG. 2a shows a side view of one embodiment of the cargo bed assembly 3 of FIG. 1. The horizontal channel extensions 14 and 15 are disposed to the side walls 6 and extending from the head end 8 and to the upper ends of the inclined channel tracks 12, 13. A cargo bed fitting 38 is attached to the central lower portion of the outside surface of the head end 8 of the cargo bed assembly 3 to facilitate the cargo bed assembly 3 to be engaged with the trailer assembly 2.

FIG. 2b is a side view of another embodiment of the cargo bed assembly 3 of FIG. 1. The horizontal channel extensions 14 and 15 are disposed to the side walls 6 and extending from the head end 8 and to the upper ends of the inclined channel tracks 12, 13. At one end of the horizontal channel extension 15 is an enlarged opening 54 which is able to facilitate the receiving of the trailer lifting rollers 34. Similarly, at one end of the horizontal channel extension 14 is an enlarged opening 52 which is able to facilitate the receiving of the trailer lifting rollers 35. A pintle ring 58 is attached to the central lower portion of the outside surface of the head end 8 of the cargo bed assembly 3 to facilitate the cargo bed assembly 3 to be engaged with the trailer assembly 2.

FIG. 3 is a front end view of one embodiment of the cargo bed assembly 3 of FIG. 2a. FIG. 3 shows the head end 8 of the cargo bed assembly 3 and the horizontal channel extensions 14, 15 on both side walls 6 of the cargo bed assembly 3. The cargo bed fitting 38 is located at the central lower portion on the outside surface of the head end 8 of the cargo bed assembly 3.

FIG. 4 shows a plan view of the lift trailer of FIG. 1. In the embodiment of FIG. 4, the tongue 23 is attached to the head structure 24 which separates side structure beams 17, 21 and 18, 22 by the open space 16. The rear lifting rollers 34 are disposed to the opposite inner surface of the side structure beams 21 and 22. The front lifting rollers 35 are disposed to the opposite inner surface of the side structure beams 21 and 22. A package engine, a hydraulic pump, a reservoir and a valve are mounted at a space 36.

Figure 5:
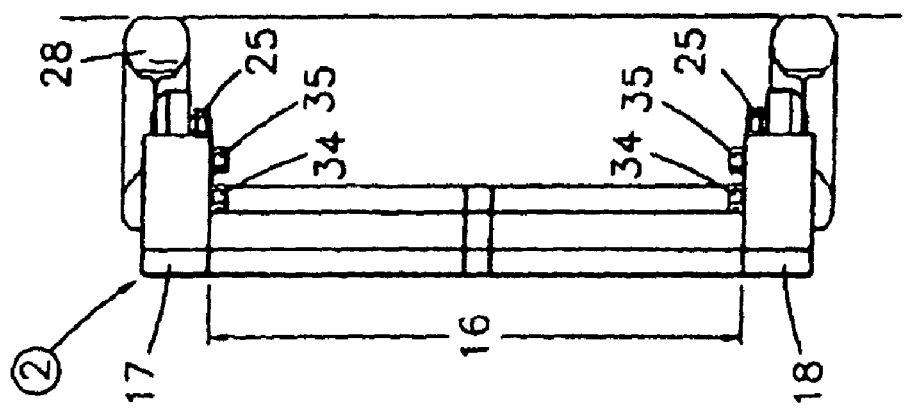
FIG. 5 is a back end view of the lift trailer of FIG. 1.

FIG. 5 is a back end view of the trailer assembly 2 of FIG. 1. The front lifting rollers 35 are mounted at a level lower than the rear lifting rollers 34, and all lifting rollers 34, 35 are extended into the open space 16.

Figure 7:
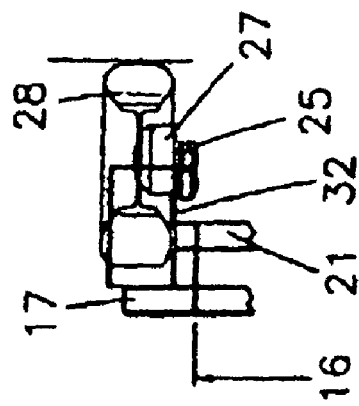
FIG. 7 is a sectional view.
Figure 6:
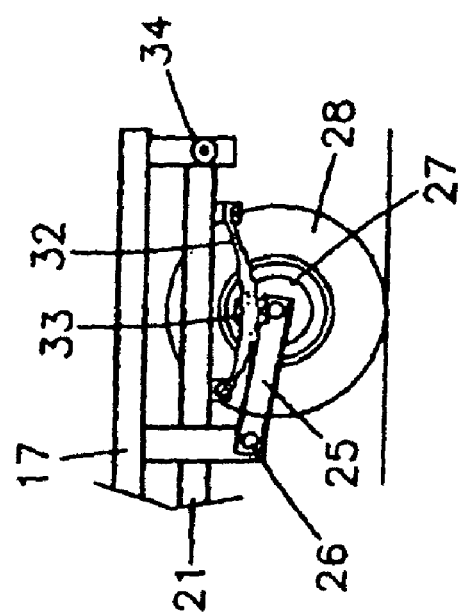
FIG. 6 is a sectional view.

FIG. 6 is a sectional view taken along line 10-10 of FIG. 4. FIG. 7 is a sectional view taken along line 20-20 of FIG. 4. Referring to both FIG. 6 and FIG. 7, the quarter axles 25, the leaf springs 32, and their brackets 33 fit under the side structure beams 17, 21 to maintain the open space 16. One end of the quarter axles 25 is fitted with a pivot tube 26 which is jointed to the side structure beams 17, 21 to preserve alignment of the tires 28 which is mounted on a break spindle 27 that attached to the other end of the quarter axles 25.

Figure 8:
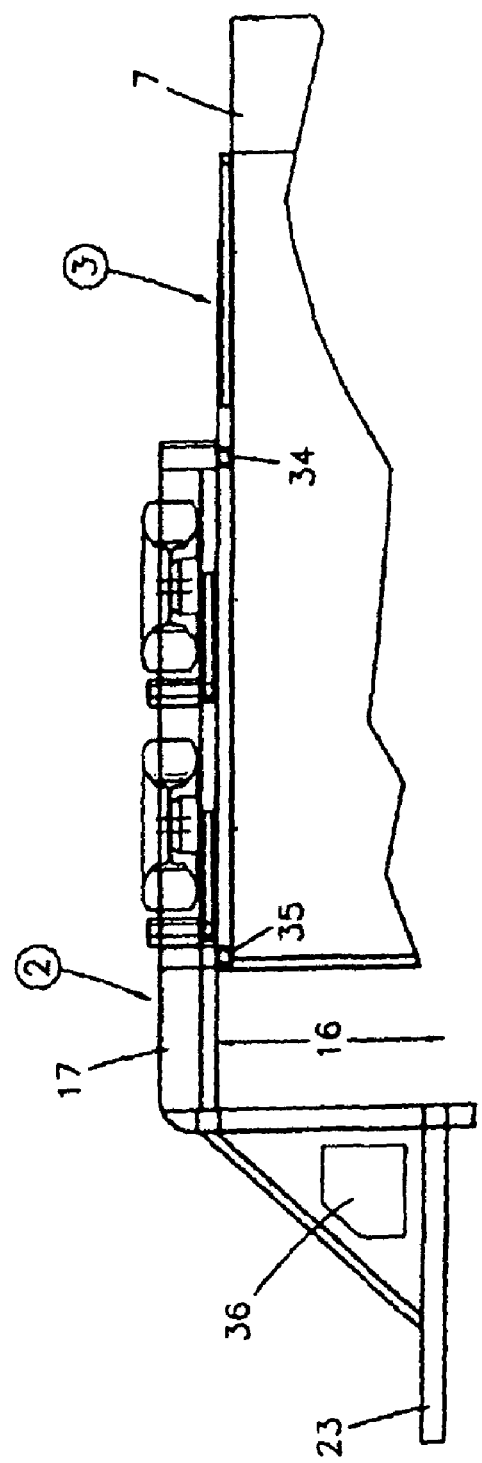
FIG. 8 is a partial plan view of the lift trailer of FIG. 1 with the cargo bed lowered to ground level.

FIG. 8 is a partial plan view of the lift trailer 2 of FIG. 1 with the cargo bed 3 lowered to ground level. FIG. 8 also shows the location of section line 30-30 through the lifting rollers 34, 35 and the inclined channel tracks 12, 13.

Figure 9A:
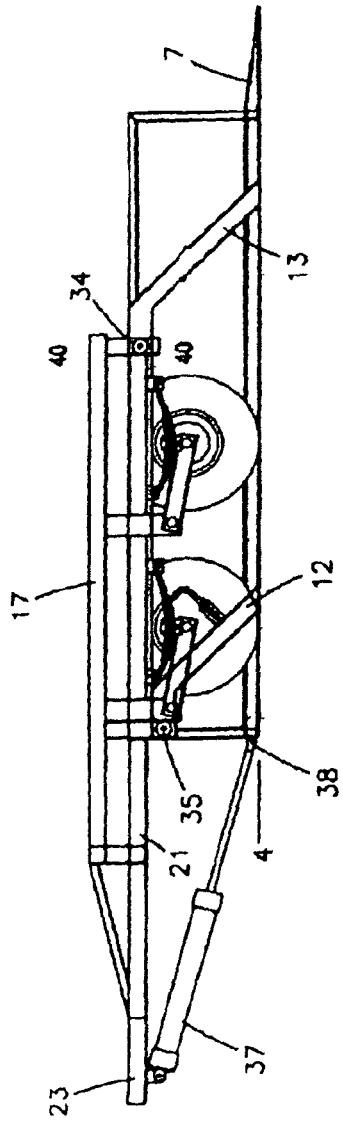
FIG. 9a is an elevational sectional view of one embodiment of the lift trailer of FIG. 1 with a cargo bed lowered to ground level.

FIG. 9a is an elevational sectional view of one embodiment of the lift trailer assembly 2 of FIG. 1 taken along line 30-30 of FIG. 8 with the cargo bed assembly 3 lowered to the ground 4. A hydraulic cylinder 37 is extended to a full stroke position against the tongue 23 of the lift trailer assembly 2 and the cargo bed fitting 38 of the cargo bed assembly 3.

Figure 9B:
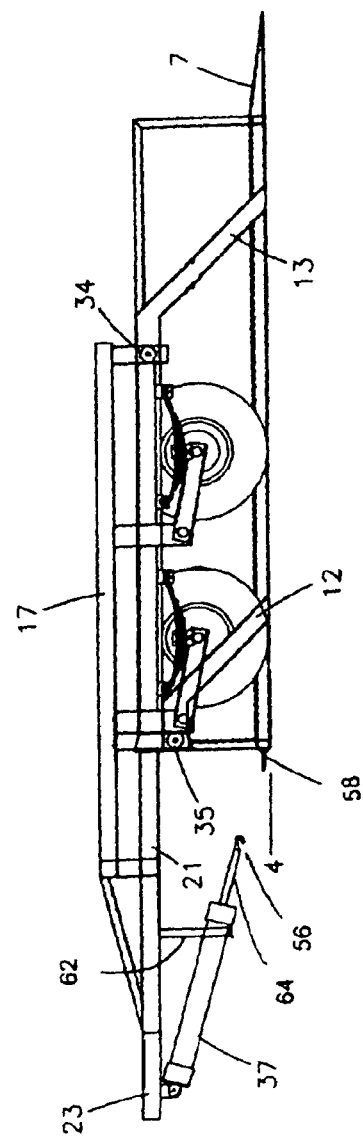
FIG. 9b is an elevational sectional view of another embodiment of the lift trailer of FIG. 1 with a cargo bed lowered to ground level.

FIG. 9b is an elevational sectional view of another embodiment of the lift trailer assembly 2 of FIG. 1 taken along line 30-30 of FIG. 8 with a cargo bed assembly 3 lowered to the ground 4. A hydraulic cylinder 37 is extended to a half stroke position against the tongue 23 of the trailer assembly 2. The hydraulic cylinder 37 has a cylinder shaft 64 that is able to stroke the hydraulic cylinder 37. A hook 56 is located at the open end of the cylinder shaft 64. A pintle ring 58 is attached to the central lower portion of the outside surface of the head end 8 of the cargo bed assembly 3. In one embodiment, the pintle ring 58 is bolted to the head end 8. Therefore, the hydraulic cylinder 37 and the cargo bed assembly 3 can be engaged by placing the hook 56 into the eye of the pintle ring 58 for the cargo bed assembly 3 to be raised up from the ground position to the transport position or laid down from the transport position to the ground position. The cargo bed assembly 3 can be quickly disengaged from the lift trailer assembly 2 by removing the hook 56 of the cylinder shaft 64 away from the pintle ring 58 of the cargo bed assembly 3 when the cargo bed is sitting on the ground position. A hydraulic cylinder mount bracket 62 is mounted in a position to hold the hydraulic cylinder 37 on an angle to facilitate the hydraulic cylinder hook 56 to be engaged with the pintle ring 58.

Figure 10:
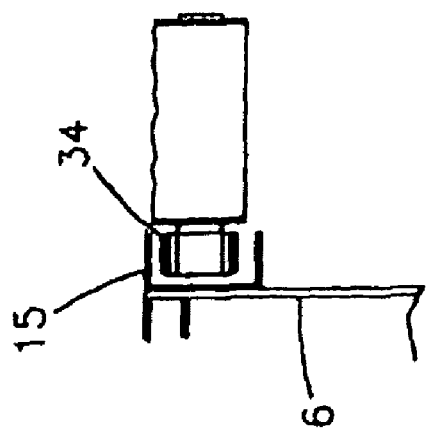
FIG. 10 is an enlarged sectional view.

FIG. 10 is an enlarged sectional view taken along line 40-40 of FIG. 9a or FIG. 9b. In the embodiment of FIG. 10, the rear lifting roller 34 is attached to the side structure beams 17, 21 and engaged in the horizontal channel extension 15 mounted on the side wall 6.

Figure 11:
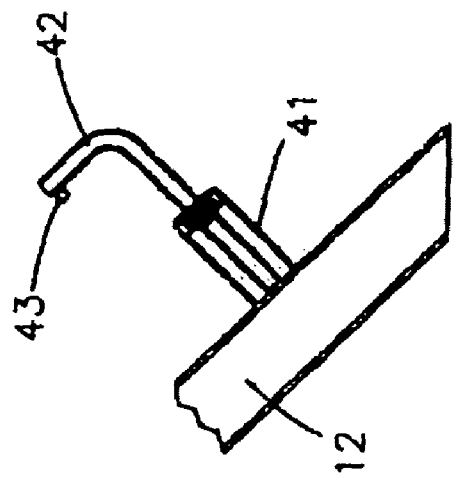
FIG. 11 is an enlarged sectional view.

FIG. 11 is an enlarged portion of FIG. 9a viewed from the same vantage point. In FIG. 11, an open lock assembly 41 is mounted on the inclined channel track 12 with a spring loaded lock pin 42 which is latched open on a hook 43.

Figure 12A:
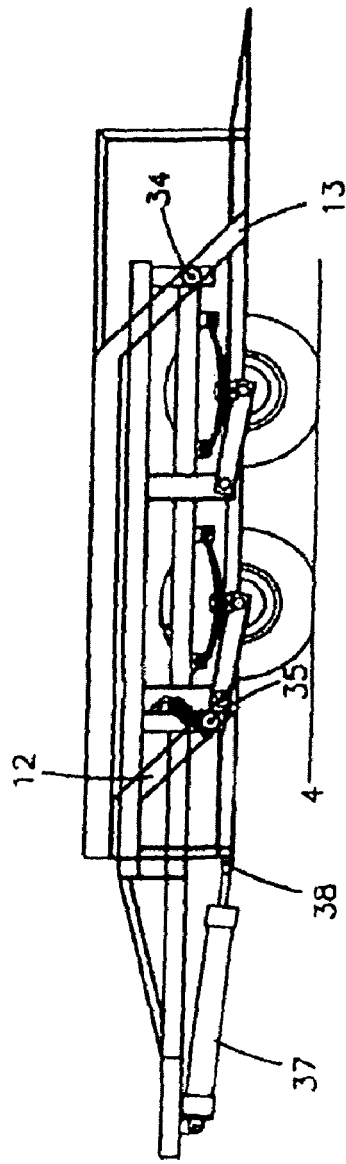
FIG. 12a is an elevational sectional view of one embodiment of the lift trailer of FIG. 1 with the cargo bed of FIG. 2a raised to a transport position.

FIG. 12a is an elevational sectional view of the trailer assembly 2 of FIG. 1 with the cargo bed assembly 3 of FIG. 2a raised to a transport position. The hydraulic cylinder 37 is in a retracted position, attaching to the cargo bed assembly 3 at the bed fitting 38 and to the tongue 23 of the trailer assembly 2.

Figure 12B:
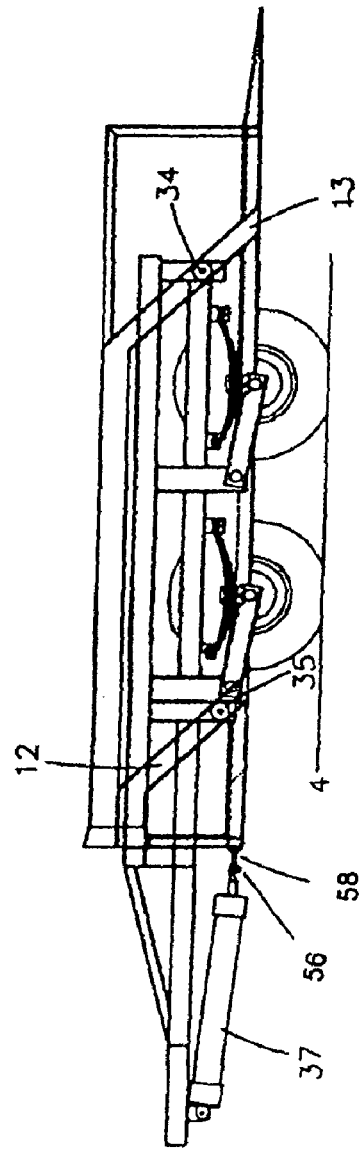
FIG. 12b is an elevational sectional view of another embodiment of the lift trailer of FIG. 1 with the cargo bed of FIG. 2b raised to a transport position.

FIG. 12b is an elevational sectional view of the trailer assembly 2 of FIG. 1 with the cargo bed assembly 3 of FIG. 2b raised to a transport position. The hydraulic cylinder 37 is in fully retracted position and the hook 56 of the cylinder shaft 64 is engaged with the pintle ring 58 of the cargo bed assembly 3.

Figure 13:
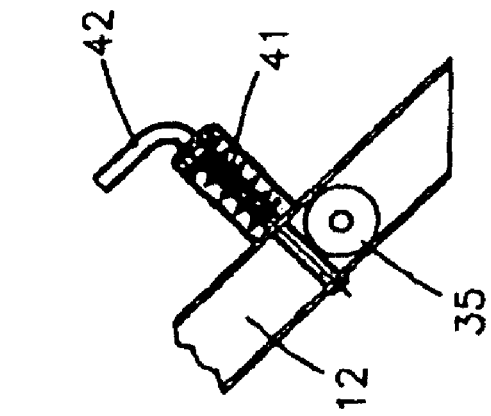
FIG. 13 is an enlarged sectional view.

FIG. 13 is an enlarged portion of FIG. 12a viewed from the same vantage point. As shown in FIG. 12a or FIG. 12b, the cargo bed assembly 3 is raised to a transport position. In FIG. 13, the front lifting roller 35 in rolled into the inclined channel track 12 where the spring loaded lock pin 42 of the open lock assembly 41 is latched through the channel track 12, thus holding the cargo bed assembly 3 in the transport position without depending on the hydraulic pressure from the cylinder 37.

Alternate designs for cargo bed assembly 3 are shown in FIGS. 14a-14f. FIG. 14a is a perspective view of an alternate cargo bed assembly 3 with portable highway traffic light. FIG. 14b is a perspective view of an alternate cargo bed with enclosed cargo box with multiple doors and cabinets. FIG. 14c is a perspective view of an alternate cargo bed with ground level loading horse compartment. FIG. 14d is a perspective view of an alternate dumping cargo bed. FIG. 14e is a perspective view of an alternate cargo bed with traffic speed sign. FIG. 14f is a perspective view of an alternate cargo bed with open cargo platform with tie down loops and castered non-highway wheels, for ease of movement around the shop.

While various embodiments of a level lift trailer with detachable cargo bed and its respective components have been presented in the foregoing disclosure, numerous modifications, alterations, alternate embodiments, and alternate materials may be contemplated by those skilled in the art and may be utilized in accomplishing the various aspects of the present invention. Thus, it is to be clearly understood that this description is made only by way of example and not as a limitation on the scope of the invention as claimed below.

What is claimed:

1. A detachable level lifting trailer system comprising:
    a) a trailer having a framed structure with an open end, a closed end, wherein the framed structure forms an open space in an interior, the open space accessible from the open end;
    b) a detachable cargo bed sized to fit into said open space, said cargo bed having at least two side walls; and
    c) plurality of lifting rollers attached to said framed structure of said trailer, said lifting rollers comprising at least a pair of front rollers and a pair of rear rollers, said front rollers being at a different elevation relative to level ground when situated thereupon than said rear rollers, a plurality of front and rear inclined channel tracks disposed on said cargo bed, a plurality of horizontal channel extensions each coupled to one of said plurality of front and rear inclined channel tracks on one side and each horizontal channel extension having an open end on the opposite side to said inclined channel tracks, said horizontal channel extensions corresponding to said rollers and also being at different elevation from one another to correspond to the difference in elevation between said front and rear rollers,
    d) wherein said open end of each horizontal channel extension is designed to allow the corresponding lifting roller to exit the horizontal channel extension and enable the cargo bed to detach from the trailer and wherein said inclined channel tracks and said horizontal channel extensions are sized to receive and guide said lifting rollers, wherein said lifting rollers are located in the horizontal channel extensions when the cargo bed is placed on a ground position and said lifting rollers are located in the inclined channel tracks when the cargo bed is raised up to a transport position.

2. The detachable level lifting trailer system of claim 1, wherein a lifting roller disposed near to said open end of said trailer is at a position higher than a lifting roller disposed near a head structure.

3. The detachable level lifting trailer system of claim 2, wherein said trailer further comprises a tongue structure coupled to said head structure.

4. The detachable level lifting trailer system of claim 3, wherein said trailer further comprises a horizontal pull hydraulic cylinder coupled to said tongue structure of said trailer and said cargo bed for raising up said cargo bed to a transport position.

5. The detachable level lifting trailer system of claim 4, wherein said trailer further comprises a plurality of spring loaded pin locks, each of said spring loaded pin lock is able to extend into one of said inclined channel tracks to retain said cargo bed in said transport position without a continuous pulling force from said hydraulic cylinder.

6. The detachable level lifting trailer system of claim 4, wherein said hydraulic cylinder has a shaft with a hook located at an open end of said shaft, wherein said hook is engaged with a pintle ring of said cargo bed when said cargo bed is raised up from the ground position to the transport position and said cargo bed can be quickly disengaged from the trailer by pulling the hook away from the pintle ring when the cargo bed is sitting on the ground position.

7. The detachable level lifting trailer system of claim 6, wherein said trailer further comprises a hydraulic cylinder mount bracket for facilitating an attachment of the hydraulic cylinder with said pintle ring.

8. The detachable level lifting trailer system of claim 1, wherein said framed structure comprising structure beams.

9. The detachable level lifting trailer system of claim 1, wherein said trailer further comprises a leaf spring suspended on a plurality of quarter axles with pneumatic tires.

10. The detachable level lifting trailer system of claim 1, wherein at least one of said horizontal channel extensions has an opening larger than the horizontal channel extensions to facilitate the receiving of the trailer lifting rollers.

11. A cargo bed assembly for use with a trailer system comprising:
    a) a cargo bed;
    b) at least two cargo side walls;
    c) a cargo head end;
    d) a pintle ring bolted to said cargo head end;
    e) a channel end opposite to said cargo head end; and
    f) a plurality of inclined channel tracks angled substantially at 45 degrees, each of said inclined channel track is parallel to one another and disposed on an outer surface of said cargo side walls, each of said inclined channel tracks coupled to one side of a horizontal channel extension disposed to said cargo side walls, wherein said horizontal channel extension has an open end on the opposite side to each of said inclined channel tracks, wherein said open end of said horizontal channel extension is designed to allow a corresponding lifting roller to exit said horizontal channel extension and enable the cargo bed to detach from a trailer, and wherein said horizontal channel extension is purposed to receive the lifting roller mounted on the trailer and guide said lifting roller from said cargo head end of said cargo bed to upper ends of said inclined channel tracks.

12. The cargo bed assembly of claim 11, wherein a horizontal channel extension coupled to an inclined channel track near to said cargo head end has a lower position than a horizontal channel extension coupled to a inclined channel track near to said channel end.

13. The cargo bed assembly of claim 12, wherein each of said horizontal channel extensions has a larger opening near to an end of said cargo head end than an opening near to an end of said channel end to facilitate engagement by said lifting rollers.

* * * * *